(12) United States Patent
Tzeng

(10) Patent No.: US 6,693,906 B1
(45) Date of Patent: Feb. 17, 2004

(54) APPARATUS AND METHOD FOR BUFFER-FREE EVALUATION OF PACKET DATA BYTES WITH MULTIPLE MIN TERMS

(75) Inventor: Shr-jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 751 days.

(21) Appl. No.: 09/618,059

(22) Filed: Jul. 17, 2000

(51) Int. Cl.[7] .......................... H04L 12/28; H04L 12/56
(52) U.S. Cl. ........................................ 370/389; 370/351
(58) Field of Search ................................ 370/351, 389, 370/392, 229, 235

(56) References Cited

U.S. PATENT DOCUMENTS 5,802,054 A * 9/1998 Bellenger .................... 370/401
5,953,335 A 9/1999 Erimli et al.

FOREIGN PATENT DOCUMENTS

WO   WO 9835480   8/1998
WO   WO 9953648   10/1999

* cited by examiner

Primary Examiner—Huy D. Vu
Assistant Examiner—Jason Mattis
(74) Attorney, Agent, or Firm—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a network switch port having a filter (i.e., a packet classifier module) configured for evaluating an incoming data packet on an instantaneous basis. The network switch port filter includes a min term memory configured for storing min term values of a plurality of equations. Each min term value specifying a prescribed value for comparison with a corresponding selected byte of the incoming data packet where each equation is identified by a corresponding equation identifier. The network switch port filter also includes a corresponding min term generator configured for simultaneously comparing a received byte of the incoming data packet with the min terms that correspond to the received byte and generating respective min term comparison results. The network switch port filter further includes a plurality of equation core modules. Each core module is configured for simultaneously generating a corresponding frame tag based on a corresponding equation identifier for a corresponding selected equation and the min term comparison results.

14 Claims, 6 Drawing Sheets

APPARATUS AND METHOD FOR BUFFER-FREE EVALUATION OF PACKET DATA BYTES WITH MULTIPLE MIN TERMS

BACKGROUND OF THE INVENTION

1. Field of the Invention

The present invention relates to switching of data packets in a FIFO-less non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1 q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

One consideration in developing a network switch operating in a non-blocking mode is to include buffers in the design of the network switch. However, in switching layer 2 and layer 3 data packets, the size of buffers may be as large as 1500 bytes to match wire rates. Coupled with the fact that buffers occupy a proportionally larger amount of space on the wafer chip as compared to other components of the network switch, the use of buffers to match wire rates increases the overall cost of the network switch by increasing the overall size of the wafer chip.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets or the size of the network switch.

There is also a need for an arrangement to provide layer 2 switching and layer 3 switching capabilities at a minimal cost within the network switch while maintaining non-blocking of the data packets.

There is also a need for an arrangement to provide layer 2 switching and layer 3 switching capabilities without buffering to lower the cost of the network switch.

There is also a need for an arrangement to enable a network switch port to instantaneously evaluate an incoming data packet and determine a layer 3 or higher protocol, to provide the associated switch fabric with sufficient time to process the incoming data packet according to the detected protocol.

These and other needs are attained by the present invention, where a network switch port filter is configured for evaluating an incoming data packet. The network switch port filter includes a min term memory configured for storing min term values of a plurality of equations. Each min term value specifying a prescribed value for comparison with a corresponding selected byte of the incoming data packet where each equation is identified by a corresponding equation identifier. The network switch port filter also includes a corresponding min term generator configured for simultaneously comparing a received byte of the incoming data packet with the min terms that correspond to the received byte and generating respective min term comparison results. The network switch port filter further includes a plurality of equation core modules. Each core module is configured for simultaneously generating a corresponding frame tag based on a corresponding equation identifier for a corresponding selected equation and the min term comparison results. Since a given received byte of the incoming data packet is simultaneously compared with the all the relevant min terms, this ensures the real time evaluation of the incoming data packet. Moreover, a plurality of equation core modules minimizes the need for a buffer because of the simultaneous generation of multiple frame tags minimizes latency in switching of the incoming data packet.

One aspect of the present invention provides a method of evaluating an incoming data packet at a network switch port. The method includes storing min term values of a plurality of equations in a min term memory. Each min term value specifies a prescribed value for comparison with a corresponding selected byte of the incoming data packet where each equation is identified by a corresponding equation identifier. The method also includes simultaneously comparing a received byte of the incoming data packet with min terms that correspond to the received byte and generating min term comparison results with a min term generator. The method further includes simultaneously generating a plurality of frame tags from a plurality of equation core modules. Each equation core module is configured for simultaneously generating a corresponding frame tag based on a corresponding equation identifier for a corresponding selected equation and the min term comparison results. The simultaneous comparisons of min terms and multiple equation core modules ensures that the incoming data packet may be evaluated in real time, reducing a need for buffering of incoming data packets, hence reducing the overall cost of the network switch port.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
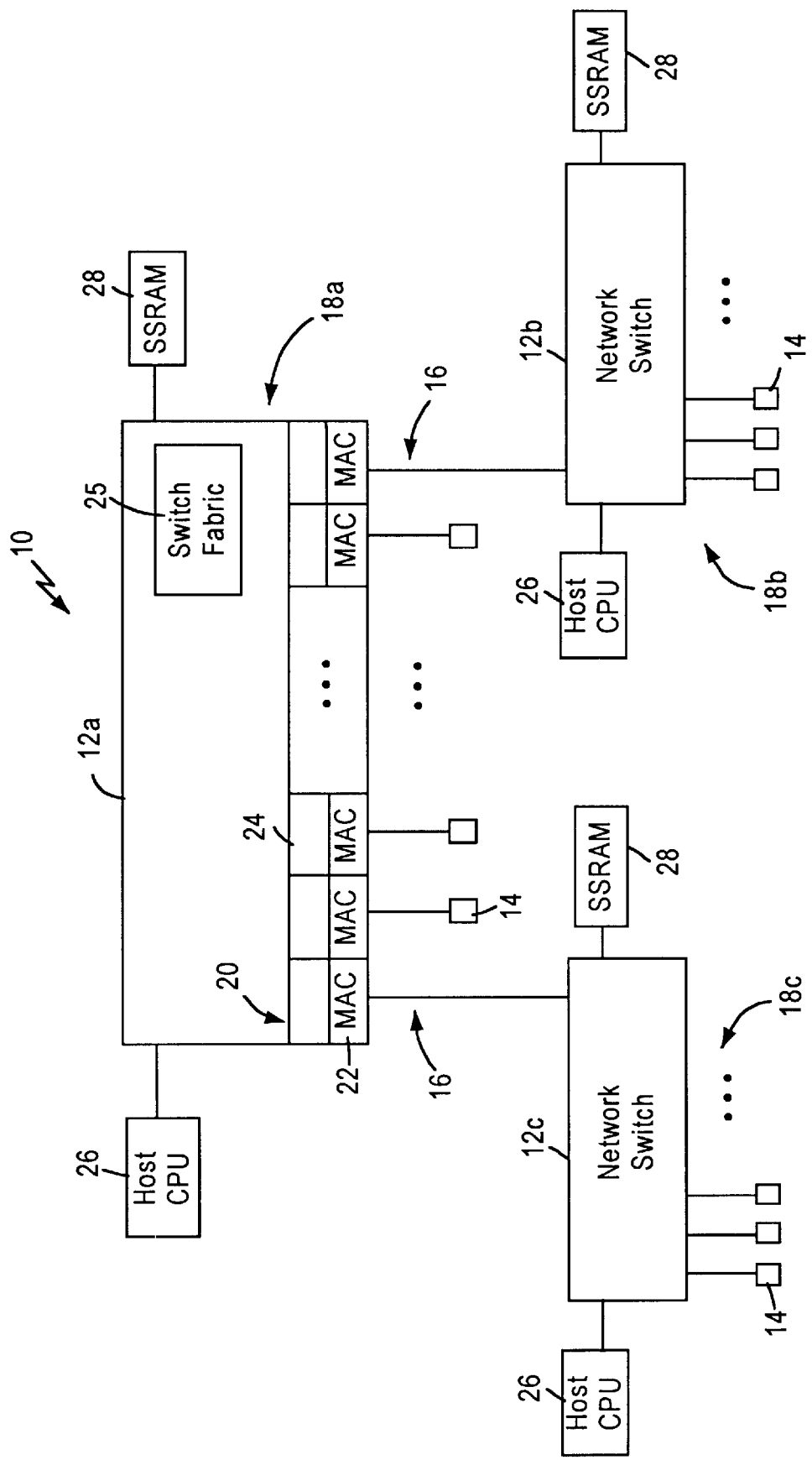
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 2A:
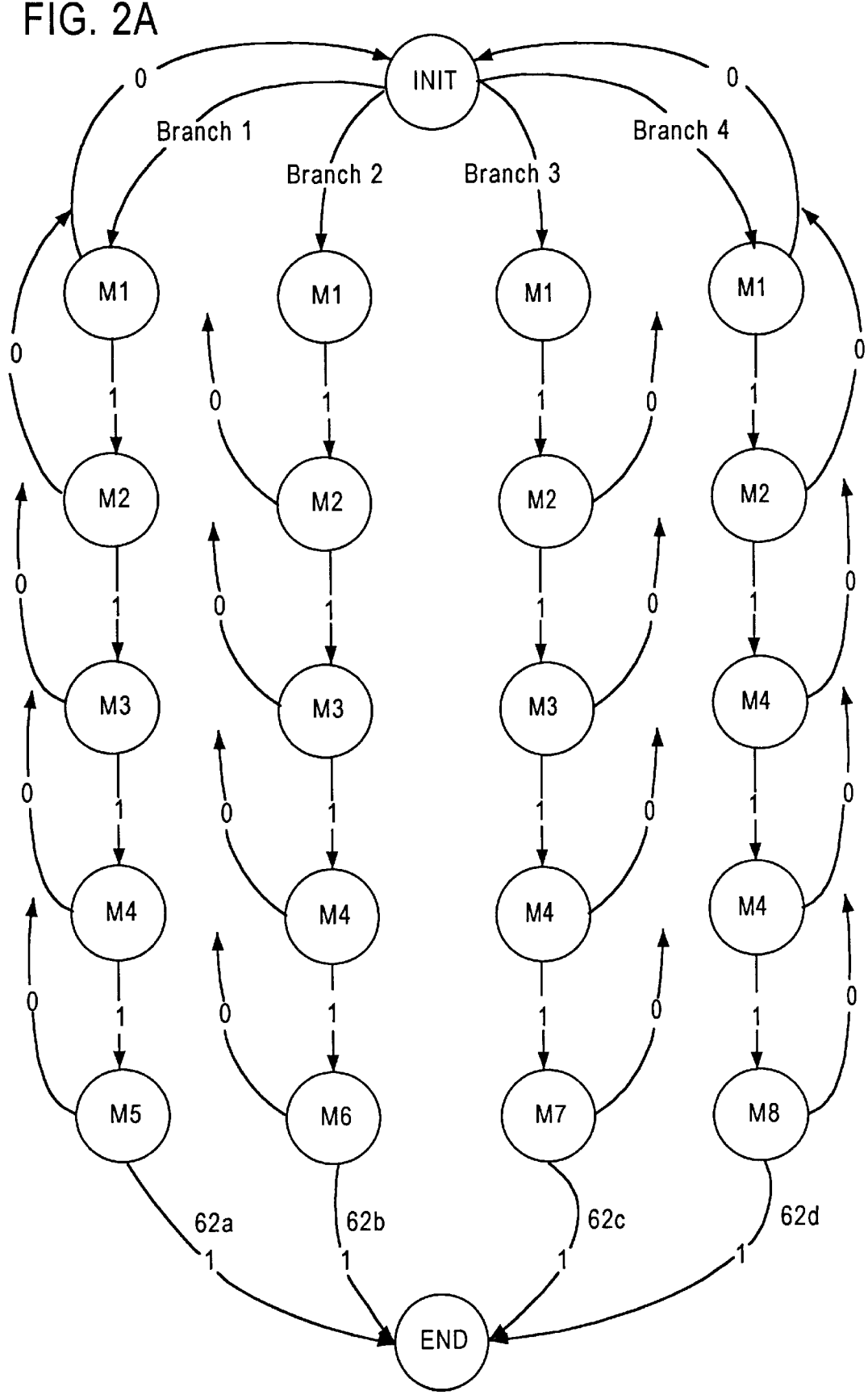
FIGS. 2A and 2B are diagrams illustrating the simultaneous processing of two templates of an equation by the packet classifier module 24.
Figure 2B:
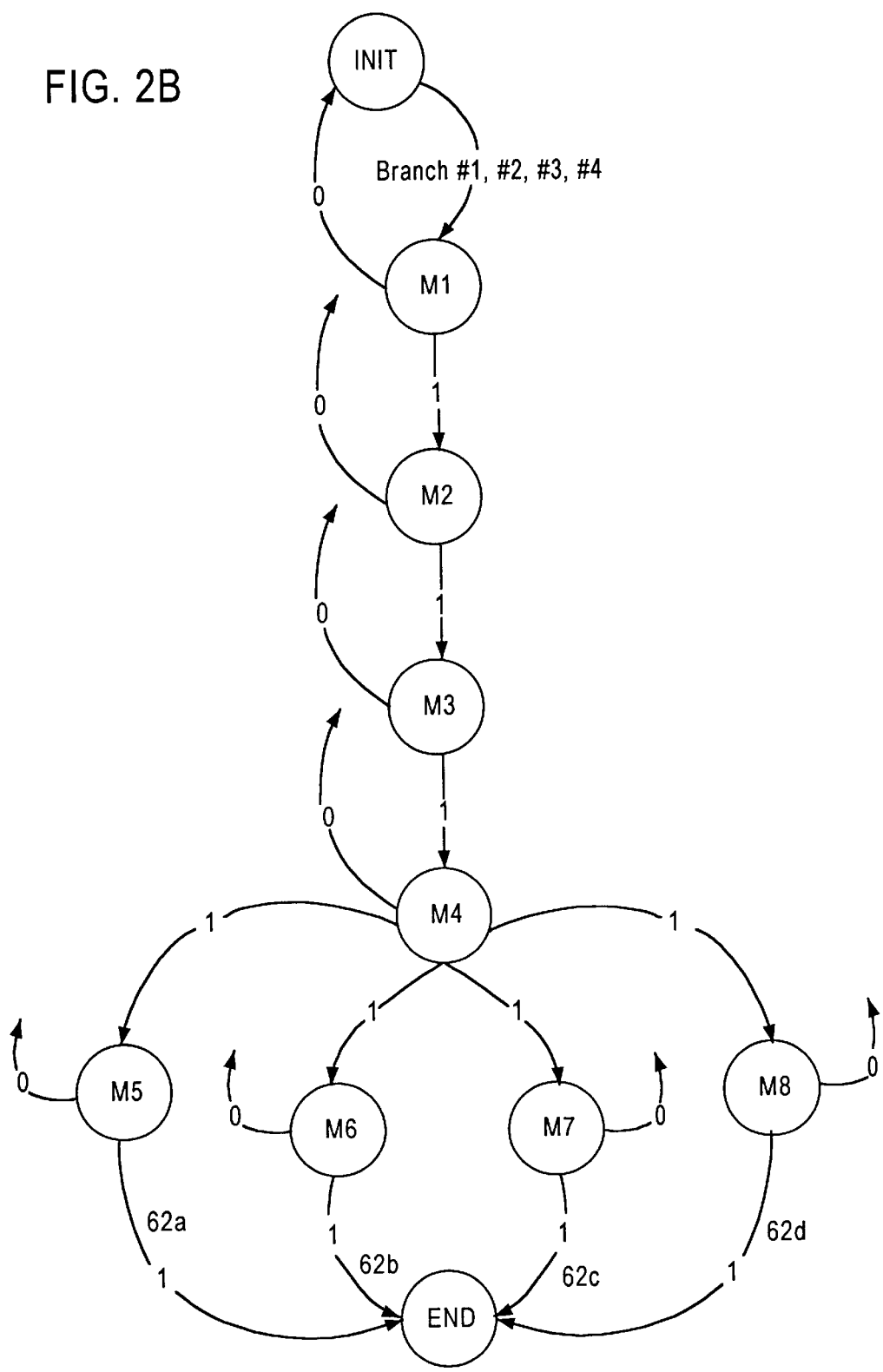

FIGS. 2A and 2B are diagrams illustrating the simultaneous processing of two templates of an equation by the packet classifier module 24. FIG. 2A illustrates the logical evaluation by the packet classifier module 24 of the equation:

$$Eq1=M1*M2*M3*M4*(M5+M6+M7+M8).$$

FIG. 2B illustrates how the equation Eq1 would actually be stored in the min term memory 70. The equation Eq1 includes four templates 62a, 62b, 62c, and 62d: the template 62a includes the min terms M1, M2, M3, M4, and M5; the template 62b includes the min terms M1, M2, M3, M4, and M6; the template 62c includes the min terms M1, M2, M3, M4, and M7; and the template 62d includes the min terms M1, M2, M3, M4, and M8. Each template 62 corresponds to a specific IP data format recognizable based on the header of the IP data packet 32. For example, templates 62a and 62c may be configured for identifying an HTTP packet, and templates 62b and 62d be may be configured for identifying an SNMP packet. Specifically, an HTTP packet is identified if it is in IPv4 format, the time to live field in IP is bigger than one, the protocol field in IP header is TCP, header checksum is correct, source TCP port is 80 or destination TCP port is 80. An SNMP packet is identified if it is in IPv4 format, the time to live field in IP is bigger than one, the protocol field in IP header is TCP, header checksum is correct, source TCP port is 25 or destination TCP port is 25.

Hence, the following min terms may be established to represent all the above-described criteria:

M1=packet is in IPv4 format
M2=time to live field in IP is bigger than one
M3=protocol field in IP header is TCP
M4=header checksum is correct
M5=source TCP port is 80
M6=destination TCP port is 80
M7=source TCP port is 25
M8=destination TCP port is 25

Hence, the templates 62a and 62c identify HTTP packets, and the templates 62b and 62d identify SNMP packets. Thus, equation one (Eq1) specifies that a specific result (e.g., the tag having a specified value) should be output to the switch fabric 25 if either template 62a, 62b, 62c, or 62d are true.

Figure 3:
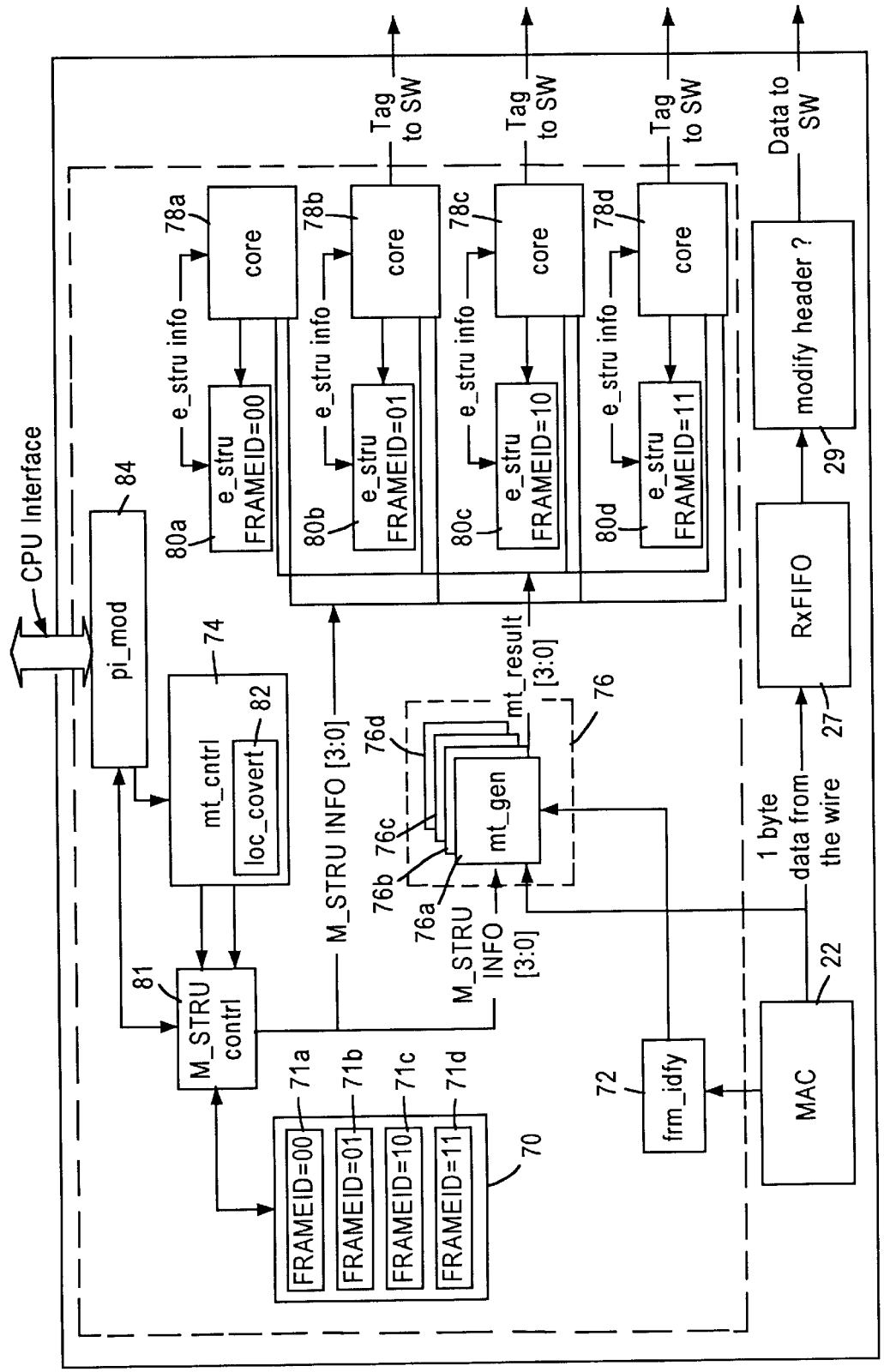
FIG. 3 is a block diagram illustrating the network switch port of FIG. 1, including the network switch port filter, according to an embodiment of the present invention.

Moreover, the min terms M1 . . . M8 are arranged within the associated templates 62a and/or 62b in a prescribed order that corresponds to the relative position of a data byte in the incoming data stream. As illustrated in FIG. 3, the min term M1 is configured for comparison with the first byte (B1) of the IP packet 32, the min term M2 is configured for comparison with a subsequent byte (B2) of the IP packet 32 that follows B1, the min term M3 is configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

FIG. 3 is a block diagram illustrating the packet classifier module 24 according to an embodiment of the present invention. As shown in FIG. 3, the network switch port 20 includes a MAC 22, a receive FIFO buffer 27, a header modifier 29, and the packet classifier module 24. The packet classifier module 24, also referred to as a network switch port filter, is configured for buffer-free identification (i.e., evaluation) of the incoming data packet at the network switch port 20, and supplying to the switch fabric 25 a multiple tags that specifies the action to be performed on the data packet based on type of data packet being received. Specifically, the packet classifier module 24 simultaneously compares the incoming data packet with a plurality of templates of a plurality of equations configured for identifying respective data formats. The packet classifier module 24, based on the comparison between the incoming data packet and the plurality of templates, simultaneously generates tags that are to be supplied to the switch fabric 25.

Specifically, the packet classifier module 24 generates a comparison result that identifies the incoming data packet by detecting at least one matched template from a plurality of templates. The packet classifier module 24 then identifies which equations correspond to the matched templates, and generates tags specified by those equations.

As shown in FIG. 3, the network switch port filter 24 a min term memory 70, a frame identifier 72, a min term controller 74, a plurality of equation core modules 78a, 78b, 78c, 78d, a equation results memory 80, and a pi_mod interface 84. The network port filter of FIG. 3 also includes a min term memory controller 81.

The processor interface module (pi_mod) 84 is used for transferring the generated min terms from the host CPU 26 into the min term memory 70.

The min term memory 70 is configured for storing min term values, e.g., (M1, M2, M3, and etc.,). Furthermore, the min term memory 70 may logically subdivided or partitioned into four partitions by the min term memory controller 81.

The min term memory controller 81 is configured to store and retrieve min term values from the min term memory 70. The min term memory controller 81 is also configured to receive min term values from the pi_mod interface 84 and to retrieve min term values in response to requests from min term controller 74.

The min term memory controller 81 is further configured to logically partition the min term memory 70 into four logical partitions 71a, 71b, 71c, 71d. The min term memory controller 81 is configured to store min term values based on the location of each min term of each equation based on the least two significant bits of the equation identifier field 110 shown in FIG. 5.

Figure 5:
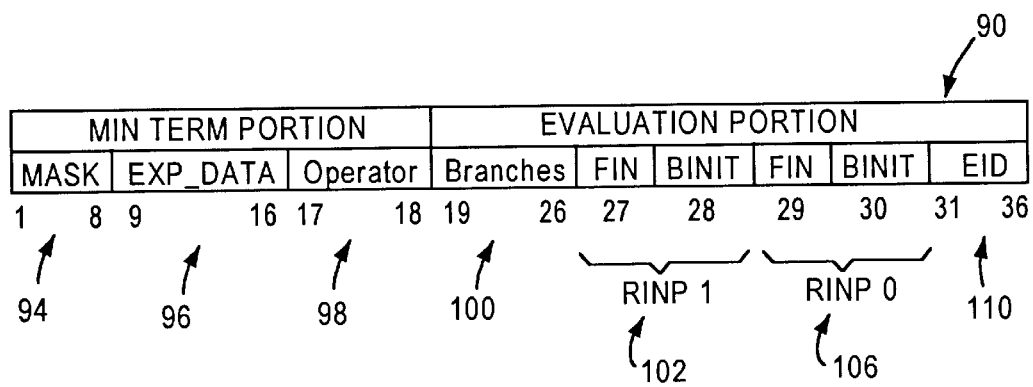
FIG. 5 is a diagram illustrating a table entry of a min term in the min term memory of FIG. 3 according to an embodiment of the present invention.

FIG. 5 is a diagram illustrating the data format of the min term structure in the min term memory 70. According to the disclosed embodiment, the min terms are stored in the min term memory 70 in an order corresponding to the relative position of the data byte to be compared based on the least two significant bits of the equation identifier field 110. Hence, all min terms that are to be compared to the first data byte of an equation with the least two significant bits specified as "00" are stored together in a first part of the logical partition 71a of the min term memory 70, followed by min terms to be compared with the second data byte, etc.

Alternatively, the min terms may be stored in an order based on relevant information within the IP header, as well as the relative position of the data byte to be compared. Hence, the min terms may be stored in an order for comparing the sequence of data bytes providing the source IP address, destination IP address, and source and source and destination ports; in this case, non-relevant data bytes at the beginning of the IP frame would not have associated min terms stored at the beginning of the min term memory 70, further improving the efficiency of the min term memory 70.

Each table entry 90 includes a min term portion and an evaluation portion. The min term portion includes a mask field (MASK) 94, an expected data field (EXP_DATA) 96, and an operator field (OPERATOR) 98. Based on the position of the table entry 90 in the min term memory 70, the min term controller 74 is able to determine which byte of the IP packet 32 that needs to be compared with the corresponding min term, relative to the beginning 64 of the IP packet. The mask field 94 is a mask that is used by the min term generator 76 in performing comparisons; if the mask has a bit set to 1, the value is compared, and if the mask value has zeros in the field, the comparison is a don't care. The expected data field 96 specifies the expected data to be compared with the relevant data byte of the IP packet 32. The operator field 98 specifies the type of comparison to be performed by the min term generator, for example: less than, less than or equal to, equal to, greater than, greater than or equal to, and not equal to.

Figure 4:
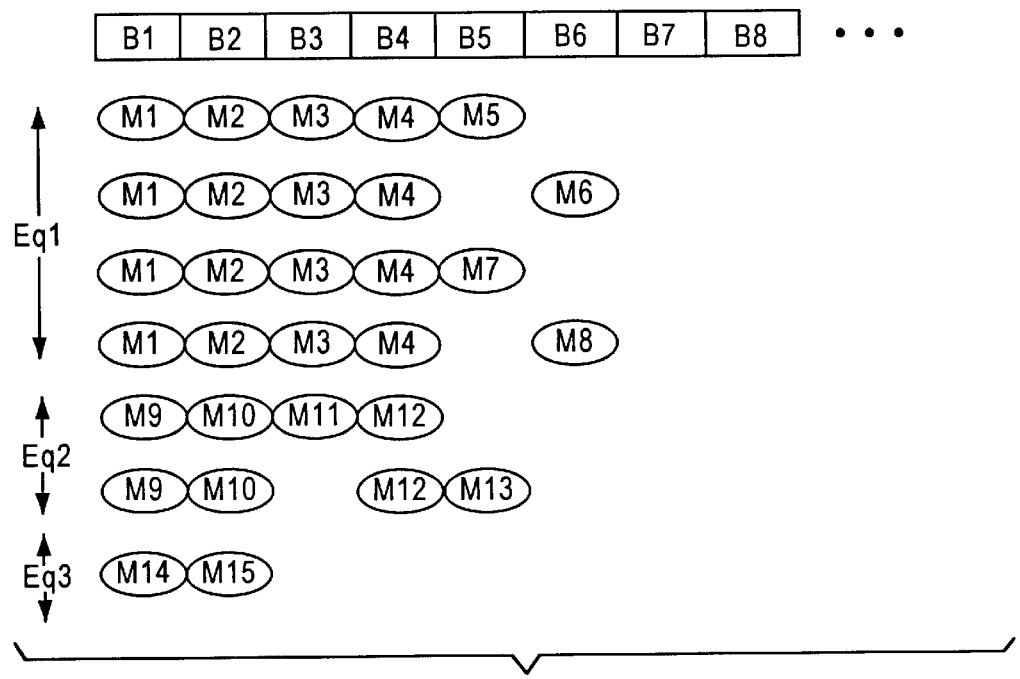
FIG. 4 is a diagram illustrating in further detail the simultaneous processing of min terms by network switch port filter 24.

The evaluation portion includes a branches portion 100, a response portion (RINP1) 102 for the case where the comparison of the min term portion is true, a second response portion (RINP0) 106 for the case where the comparison of the min term portion is false, and an equation identifier 110. The branches portion 100 specifies the order of the OR term in the equation; for example, the min term M1 as shown in FIGS. 2 and 4 would have its branches portion set to 0000 1111, indicating that the first four branches of the equation specified in the equation identifier field 110 are to include the corresponding min term. The use of eight bits for the branches portion assumes that there are a maximum of eight branches in any given equation.

The response portion 102 specifies the operation to be performed if the min term portion is evaluated as true relative to the compared data byte. In particular, the finish bit (FIN) is set to one if the results of the equation is determined if the min term result is true; the back to initial (BINIT) is set to one if the evaluation process should return to the initial state (init) if the min term result is true. For example, in the case of min term M1, the FIN bit and the BINIT bit of RINP1 are set to zero, since additional comparisons are needed if the min term result is true. In the case of min terms M5, M6, M7, and M8, the FIN bit of RINP1 is set to one, since a comparison result of "true" results in the end of the evaluation, as shown in FIG. 2.

The response portion 106 specifies the operation to be performed if the min term portion is evaluated as false relative to the compared data byte. In particular, the finish bit (FIN) is set to one if the results of the equation is determined if the min term result is false; the back to initial (BINIT) is set to one if the evaluation process should return to the initial state (init) if the min term result is false. For example, in the case of min term M1, the FIN bit is set to zero and the BINIT bit of RINP1 is set to one, such that the equation would return to the INIT state if the min term result M1 was false, as shown in FIG. 2.

The equation identifier field 110 identifies the equation (or template if there is only one template in an equation) that the min term corresponds to.

Hence, an equation core 78a . . . 78d determines whether any specified equation has a template 62 that matches the incoming data stream. Based on the multiple simultaneous comparisons of the incoming data stream with the multiple templates 62, the equation core module 78a . . . 78d can identify a matching equation, and generate the appropriate tag corresponding to the matched equation for help it to the switching fabric 25. If desired, the core 78a . . . 78d by also output a command to the header modifier 29 to modify the layer 2 header, the layer 3 header, or both, before transferring the data to the switch.

Returning to FIG. 3, the packet classifier 24 also includes a frame identifier 72 configured for identifying the type of layer 2 frame being received; in particular, identifying the type of layer 2 frame being received (e.g., Ethernet, IEEE 802 to 3, etc.) enables identification of the start position 64 of the IP packet 32 within the layer 2 packet 30.

The min term controller 74 is configured for fetching the min terms from the min term memory 70 corresponding to a selected byte of the IP frame 32. The min term controller 74 also includes a location converter 82 configured for specifying the actual byte location (byte_location) of the start point 64 in response to receiving a frame type (frm_type) signal from the frame identifier 72 that specifies the type of layer 2 frame. Hence, the min term controller 74, in response to detecting the beginning of the IP packet, requests from the min term memory controller 81 all the min terms that are to be compared with the first byte (B1) of the IP packet 32, for example min terms M1, M9, and M14 for equations Eq1, Eq2, and Eq3 in FIG. 6. The min term memory controller 81 then forwards the min term values (M_STRU INFO) to the min term generator 76 and the equation core modules 78a . . . 78d over a four-wire serial bus.

The min term generator 76 performs the actual min term comparisons between the min terms of a plurality of equations fetched by the min term controller 74 and the selected byte of the incoming data stream. Any given received byte may be compared with min terms of up to four equations. However, the min term generator 76 is only configured to compare a maximum of thirty-two (32) min terms for each corresponding byte. Hence, for any given received byte, the min term generator may perform up to 32 min term comparisons, the 32 min terms may distributed over four or less equations. In effect, the min term generator 76 may be logically divided into four min term generators 76a . . . 76d.

The min term generator 76 is configured to receive an incoming byte of the incoming data packet is forwarded from the MAC interface 22 once every eight clock cycles. The min term generator 76 is configured to compare the received byte with min terms of a plurality of equations during every clock cycle as shown in FIG. 6.

Figure 6:
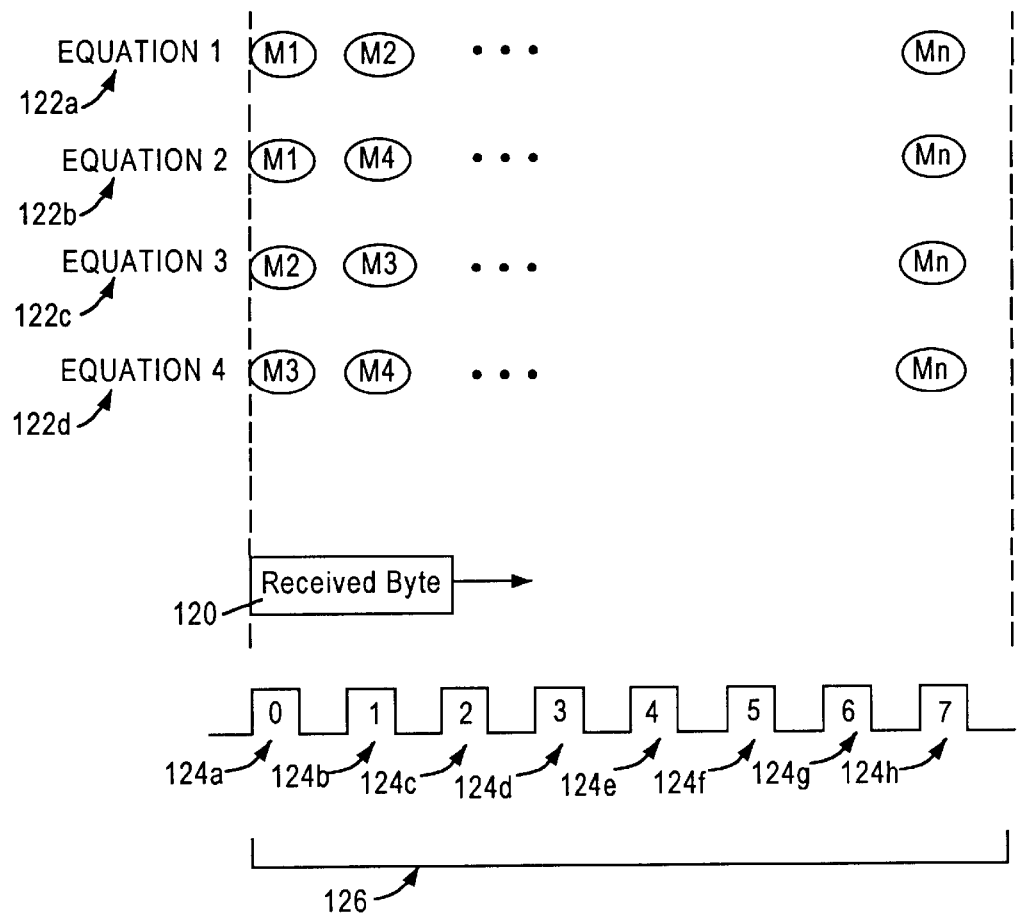
FIG. 6 is a diagram illustrating the min term generator 76 of FIG. 3 during a comparison cycle for a received byte with the min terms associated with four equations

FIG. 6 illustrates the min term generator 76 of FIG. 3 during a comparison cycle for a received byte with the min terms associated with four equations. Since a received byte 120 is forwarded to the min term generator 76 once every eight clock cycles of the network switch port filter 24, the comparison cycle 126 in the min term generator includes 8 clock cycles of the network switch port filter 24. The received byte 120 is received by the min term generator 76 on clock cycle 0 124a and is compared with, e.g., the min terms M1, M1, M2, M4 of equations 122a . . . 122d, respectively. On clock cycle 1 124b, the min term generator 76 compares min terms M2, M4, M3, M4 of equations 122a . . . 122d, respectively. The comparisons continue till the end of comparison cycle 126. During the next comparison cycle, the min term generator 76 simultaneously compares a subsequent incoming data byte with the min terms associated with the subsequent incoming data byte. In this manner, multiple min term comparisons are generated by the min term generator 76 to be forwarded to the equation core modules 78a . . . 78d.

Returning to FIG. 3, the equation core modules 78a . . . 78d are configured for simultaneously generating a corresponding frame tag based on the min term comparison results received from the min term generator 76 and on corresponding equation identifier for a corresponding selected equation. The equation core modules 78a . . . 78d evaluate equations based on the least two significant bits of the equation identifier field. For example, equation identifier field of equation 122a of FIG. 5 is specified by "00" and equation identifier field of equation 122b is specified by '01'. Equation core module 78a evaluates equation 122a to generate a corresponding frame tag based on the min term results from the min term generator 76 while equation core module 78b simultaneously evaluates 122b to generate its corresponding frame tag. The results from each equation core module 78a . . . 78d are stored in a corresponding equation results memory 80a . . . 80d.

According to the above disclosed embodiment, a network switch port includes a filter capable of performing multiple simultaneous comparisons between the incoming data stream of the data packet and multiple templates configured for identifying a corresponding protocol with minimal buffering packets In Ethernet applications, the buffering requirement may be as large as 1500 bytes. Since the network switch port filter 24 includes multiple equation cores modules 78a . . . 78d simultaneously generating frame tags in parallel, the network switch port filter 24 may keep up with the wire rate of the incoming data packets, reducing a need for buffering of incoming data. Hence, reducing the overall cost of the network switch port 20 by eliminating the need for a large FIFO buffer. Moreover, the multiple simultaneous comparisons enables the network switch 12 to perform layer 3 switching for 100 Mbps and gigabit networks without blocking in the network switch. Finally, the multiple simultaneous comparisons in the order in which the data is received enables real time comparisons to be performed, as opposed to alternative schemes such as programmable logic arrays (PLAs), which would require the entire header to be received before processing can begin.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A network switch port filter configured for evaluating an incoming data packet, comprising:

a min term memory configured for storing min terms of a plurality of equations, each min term specifying a prescribed value for comparison with a corresponding selected byte of the incoming data packet wherein each equation identified by a corresponding equation identifier;

a min term generator configured for simultaneously comparing a received byte of the incoming data packet with the min terms that correspond to the received byte and generating min term comparison results; and a plurality of equation core modules, each equation core module configured for simultaneously generating a corresponding frame tag based on a corresponding equation identifier for a corresponding selected equation and min term comparison results.

2. The network switch port filter according to claim 1, further comprising:

a central processing unit interface configured for receiving min terms of each equation; and a min term memory controller configured for storing min terms of each equation in the min term memory based on the corresponding equation identifier of each equation.

3. The network switch port filter according to claim 2, wherein:

the min term controller is configured for storing min term values of each equation in the min term memory based on a least two significant bits of the corresponding equation identifier.

4. The network switch port filter according to claim 1, wherein:

the min term generator is further configured to receive the received byte of the incoming data packet once every eight clock cycles.

5. The network switch port filter according to claim 4, wherein:

the min term generator is further configured to simultaneously compare the received byte of the incoming data packet with the min terms that correspond to the received byte once per clock cycle based on the number of equation core modules.

6. The network switch port filter of claim 3, wherein the location of each stored min term in the min term memory is relative to a beginning of an IP frame within the layer 2 packet.

7. The network switch port filter of claim 1, wherein each equation core module generates the frame tag at a wire rate of the incoming data packet and prior to an end of the incoming data packet.

8. A method of evaluating an incoming data packet at a network switch port, the method comprising:

storing min term values of a plurality of equations in a min term memory, each min term specifying a prescribed value for comparison with a corresponding selected byte of the incoming data packet wherein each equation includes a respective equation identifier;

simultaneously comparing a received byte of the incoming data packet with the min terms that correspond to the received byte and generating min term comparison results with a min term generator; and simultaneously generating a plurality of frame tags from a plurality of equation core modules, each equation core module configured for simultaneously generating a corresponding frame tag based on a corresponding equation identifier for a corresponding selected equation and min term comparison results.

9. The method of claim 8, further comprising:

receiving the min terms of the plurality of equations from a central processing unit interface; and storing min terms of each equation in the min term memory based on the corresponding equation identifier of each equation.

10. The method of claim 9, wherein the storing step includes storing min terms in the min term memory based on a least two significant bits of the respective equation identifier field.

11. The method of claim 8, wherein the simultaneously comparing step includes:

receiving the received byte of the incoming data packet once every eight clock cycles by the min term generator.

12. The method of claim 11, wherein the simultaneously comparing step further includes simultaneously comparing the received byte of the incoming packet with the min terms that correspond to the received byte once per clock cycle based on the number of equation core modules.

13. The method of claim 8, wherein the storing step further includes locating each min term in the min term memory based on the relative beginning of an IP frame within a layer 2 packet.

14. The method of claim 8, wherein the simultaneously generating step includes each equation core module generating the respective frame tag at a wire rate of the incoming data packet and prior to an end of the incoming data packet.

* * * * *